(12) United States Patent
Shin et al.

(10) Patent No.: US 12,409,700 B2
(45) Date of Patent: Sep. 9, 2025

(54) AIR CONDITIONING APPARATUS AND SYSTEM FOR ELECTRIC MOTOR VEHICLES

(71) Applicants: HYUNDAI MOTOR COMPANY, Seoul (KR); KIA CORPORATION, Seoul (KR)

(72) Inventors: Gee Young Shin, Suwon-si (KR); Dae Hee Lee, Incheon (KR); Myung Hoe Kim, Seoul (KR); Dong Ho Kwon, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 646 days.

(21) Appl. No.: 17/702,247

(22) Filed: Mar. 23, 2022

(65) Prior Publication Data

US 2023/0001764 A1   Jan. 5, 2023

(30) Foreign Application Priority Data

Jul. 1, 2021   (KR) .................. 10-2021-0086656

(51) Int. Cl.
*B60H 1/00* (2006.01)
*B60H 1/22* (2006.01)

(52) U.S. Cl.
CPC ....... *B60H 1/00385* (2013.01); *B60H 1/0005* (2013.01); *B60H 1/00885* (2013.01); *B60H 1/00921* (2013.01); *B60H 1/2221* (2013.01); *B60H 2001/00128* (2013.01)

(58) Field of Classification Search
CPC .............. B60H 1/00385; B60H 1/0005; B60H 1/00885; B60H 1/00921; B60H 1/2221; B60H 2001/00128
See application file for complete search history.

(56) References Cited

U.S. PATENT DOCUMENTS

| | | | |
|---|---|---|---|
| 6,186,885 B1 * | 2/2001 | Ahn | B60H 1/00028 237/12.3 R |
| 8,474,513 B2 * | 7/2013 | Koukouravas | B60H 1/00542 165/203 |
| 8,997,838 B2 * | 4/2015 | Seto | B60H 1/00678 454/126 |
| 9,975,402 B2 * | 5/2018 | Pierron | F24H 9/0015 |
| 11,794,552 B2 * | 10/2023 | Park | B60H 1/0073 |
| 11,912,102 B2 * | 2/2024 | Lee | B60H 1/0005 |
| 2003/0042011 A1 * | 3/2003 | Vincent | B60H 1/00064 165/203 |

(Continued)

FOREIGN PATENT DOCUMENTS

KR   20080092527 A   10/2008

*Primary Examiner* — Ljiljana V. Ciric
(74) *Attorney, Agent, or Firm* — Lempia Summerfield Katz LLC (57) ABSTRACT

An air conditioning apparatus for electric motor vehicles includes a sub-heat exchanger provided between a heat exchanger and an electric heater, and the sub-heat exchanger is moved towards the heat exchanger or the electric heater so that heat is conducted to the sub-heat exchanger depending on whether or not the heat exchanger and the electric heater are operated depending on a heating condition, thereby increasing a heat dissipation area through the sub-heat exchanger during heating and thus being capable of improving heating performance.

17 Claims, 7 Drawing Sheets

(56) References Cited

U.S. PATENT DOCUMENTS

2004/0016536 A1* 1/2004 Auer .................. B60H 1/00542
                                                165/203
2006/0060343 A1* 3/2006 Litwing ............. B60H 1/00542
                                                165/204

* cited by examiner

AIR CONDITIONING APPARATUS AND SYSTEM FOR ELECTRIC MOTOR VEHICLES

CROSS-REFERENCE TO RELATED APPLICATION

This application claims priority to and the benefit of Korean Patent Application No. 10-2021-0086656, filed on Jul. 1, 2021, the disclosure of which is incorporated herein by reference in its entirety.

BACKGROUND

1. Field

The present disclosure relates to an air conditioning apparatus for electric motor vehicles, which improves heating efficiency, and to an air conditioning system for electric motor vehicles using the same.

2. Description of the Related Art

The statements in this section merely provide background information related to the present disclosure and may not constitute prior art.

Electric motor vehicles are driven using a motor configured to receive electricity from a battery and then to output driving power. Therefore, electric motor vehicles have advantages, such as no carbon dioxide emissions, very small noises and high motor energy efficiency compared to engine energy efficiency, and are thus being spotlighted as eco-friendly vehicles.

Technology relating to battery modules is used as core technology in implementation of such electric motor vehicles, and research on the weight reduction, miniaturization and reduced charging time of batteries is vigorously underway now. Battery modules may maintain optimum performance and long lifespan only when the battery modules are used in the optimum temperature environment. However, we have discovered that it is difficult to use the battery modules in the optimum temperature environment due to heat generated from the battery modules during driving and changes in outdoor temperature.

Further, because there is no waste heat occurring when fuel is combusted in a separate engine, such as an internal combustion engine, an electric motor vehicle performs heating of the interior of the vehicle using an electric heating device, and requires warm-up so as to improve charge and discharge performance of a battery in cold weather and thus uses a separate coolant-type electric heater. That is, technology that operates a cooling and heating system configured to adjust the temperature of a battery module so as to maintain the optimum temperature environment of the battery module is used separately from a cooling and heating system configured to condition air of the interior of the vehicle.

Here, such an air conditioning system configured to condition air of the interior of the vehicle employs heat pump technology that minimizes consumption of heating energy so as to increase the driving range of the vehicle, thereby being capable of minimizing energy consumption.

Particularly, in order to apply the heat pump technology, an indoor condenser and an electric heater are provided in the air conditioning system, but heating efficiency may be reduced using only the indoor condenser or the electric heater.

Therefore, in order to increase heating performance, the temperature of a refrigerant circulated to the indoor condenser is increased by increasing the driving amount of a compressor or the heating value of the electric heater is increased, but in this case, energy efficiency may be reduced.

The above information disclosed in the Background section is only for enhancement of understanding of the background of the present disclosure and should not be interpreted as conventional technology that is already known to those having ordinary skill in the art.

SUMMARY

The present disclosure provides an air conditioning apparatus for electric motor vehicles, which improves heating efficiency during heating using a heat pump, and an air conditioning system for electric motor vehicles using the same.

In accordance with an aspect of the present disclosure, an air conditioning apparatus for electric motor vehicles includes: a housing provided with an air inlet and at least one air outlet such that air is circulated therethrough, a heat exchanger and an electric heater provided to heat the air circulated in the housing so as to form heated air, and a sub-heat exchanger provided between the heat exchanger and the electric heater so as to move between the heat exchanger and the electric heater such that heat generated by the heat exchanger and the electric heater may be conducted to the sub-heat exchanger so as to improve heat conduction performance of the heat exchanger and the electric heater.

The air conditioning apparatus for electric motor vehicles may further include an evaporator provided in the housing and configured to cool the air so as to form cooled air and to selectively share a refrigerant with the heat exchanger.

The housing may have a first air flow path configured to be connected to the air inlet and to communicate with the at least one air outlet via the evaporator and a second air flow path configured to branch off from the first air flow path and to communicate with the at least one air outlet via the heat exchanger and the electric heater, and a temperature control door may be provided at a branch point of the second air flow path where the second air flow path is branched off from the first air flow path.

The heat exchanger and the electric heater may be disposed so as to be spaced apart from each other, and the sub-heat exchanger may be slid or rotated depending on a heating operating condition in a state in which the sub-heat exchanger is spaced apart from the heat exchanger and the electric heater, so as to be selectively moved towards the heat exchanger or the electric heater.

The air conditioning apparatus for electric motor vehicles may further include a moving module installed in the housing such that the sub-heat exchanger is connected to the moving module, and configured to move the sub-heat exchanger towards the heat exchanger or the electric heater.

The moving modules may include rail units installed in the housing and configured to extend towards the heat exchanger and the electric heater such that the sub-heat exchanger is movably connected to the rail units, and a driving unit installed in the housing so as to be connected to the sub-heat exchanger and operated to move the sub-heat exchanger along the rail units.

Surfaces of the heat exchanger and the sub-heat exchanger opposite each other may be configured to be matched with each other, and surfaces of the electric heater and the sub-heat exchanger opposite each other may be configured to be matched with each other.

When the heated air is formed through the heat exchanger, the sub-heat exchanger may be moved towards the heat exchanger so that heat from the heat exchanger is conducted to the sub-heat exchanger.

When the heated air is formed through the electric heater, the sub-heat exchanger may be moved towards the electric heater so that heat from the electric heater is conducted to the sub-heat exchanger.

When the heated air is formed through the heat exchanger and the electric heater, the sub-heat exchanger may be located at a neutral position between the heat exchanger and the electric heater.

In accordance with another aspect of the present disclosure, an air conditioning system for electric motor vehicles using an air conditioning apparatus includes: a refrigerant line including a compressor, a condenser, expanders and an evaporator; and a heat pump line configured to branch off from the refrigerant line after the compressor and including a heat exchanger.

The refrigerant line may include the compressor, a first valve provided at a branch point of the heat pump line off from the refrigerant line, a first expander, the condenser, a second expander and the evaporator, and a bypass line configured to extend towards the compressor and including a second valve may branch off from the refrigerant line between the condenser and the second expander.

In a cooling mode, the first valve may be open towards the bypass line, the second valve may be closed, the first expander may be fully open, the second expander may expand the refrigerant, the electric heater may not be operated, and the sub-heat exchanger may be located at a neutral position between the heat exchanger and the electric heater.

When heating is performed using the heat exchanger in a heating mode, the first valve may be open towards the heat exchanger, the second valve may be open, the first expander may expand the refrigerant, the second expander may be closed, the electric heater may not be operated, and the sub-heat exchanger may be moved towards the heat exchanger.

When heating is performed using the electric heater in a heating mode, the electric heater may be operated, and the sub-heat exchanger may be moved towards the electric heater.

When heating is performed using both the heat exchanger and the electric heater in a heating mode, the first valve may be open towards the heat exchanger, the second valve may be open, the first expander may expand the refrigerant, the second expander may be closed, the electric heater may be operated, and the sub-heat exchanger may be located at a neutral position between the heat exchanger and the electric heater.

BRIEF DESCRIPTION OF THE DRAWINGS

The above and other objects, features and other advantages of the present disclosure will be more clearly understood from the following detailed description taken in conjunction with the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, an air conditioning apparatus for electric motor vehicles and an air conditioning system for electric motor vehicles using the same according to exemplary embodiments of the present disclosure are described below with reference to the accompanying drawings.

Figure 1:
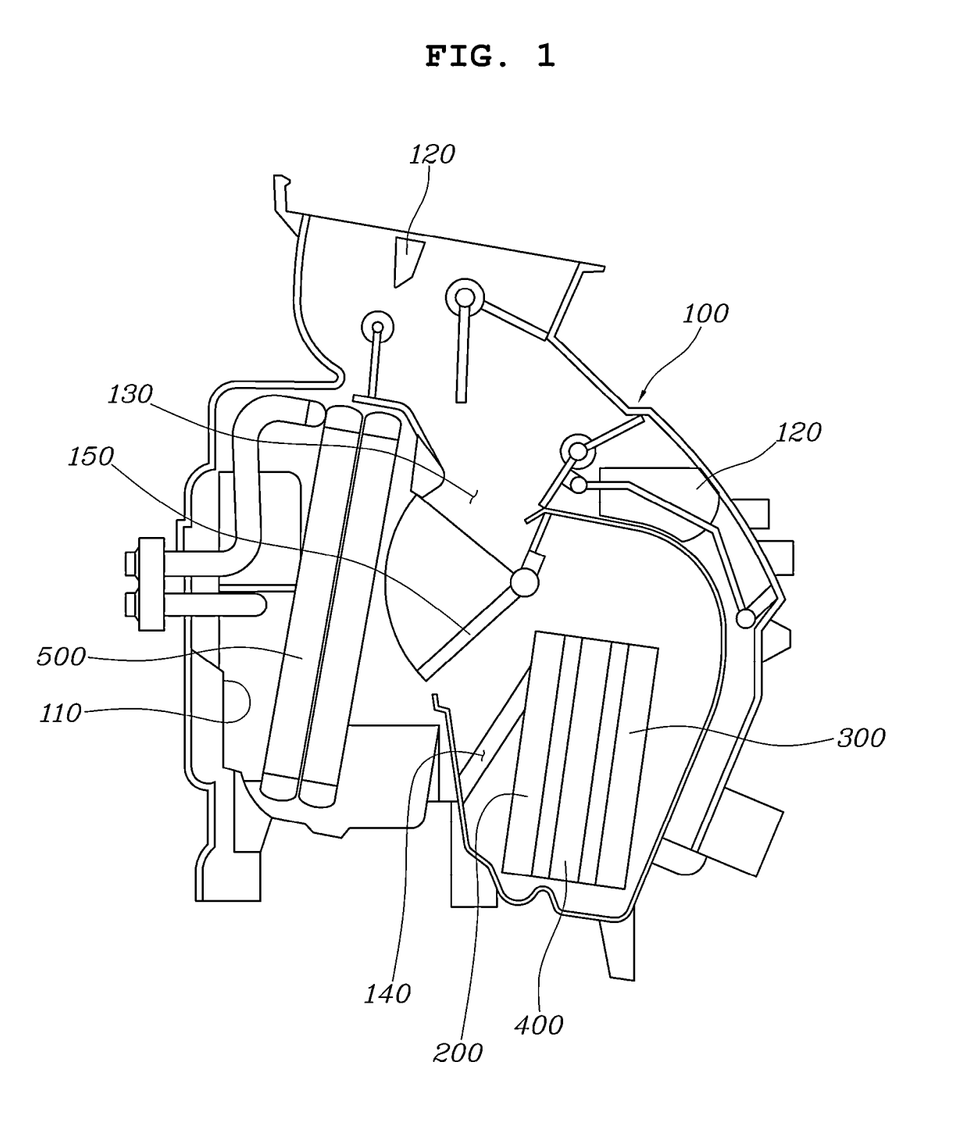
FIG. 1 is a view illustrating an air conditioning apparatus for electric motor vehicles according to one form of the present disclosure.
Figure 2:
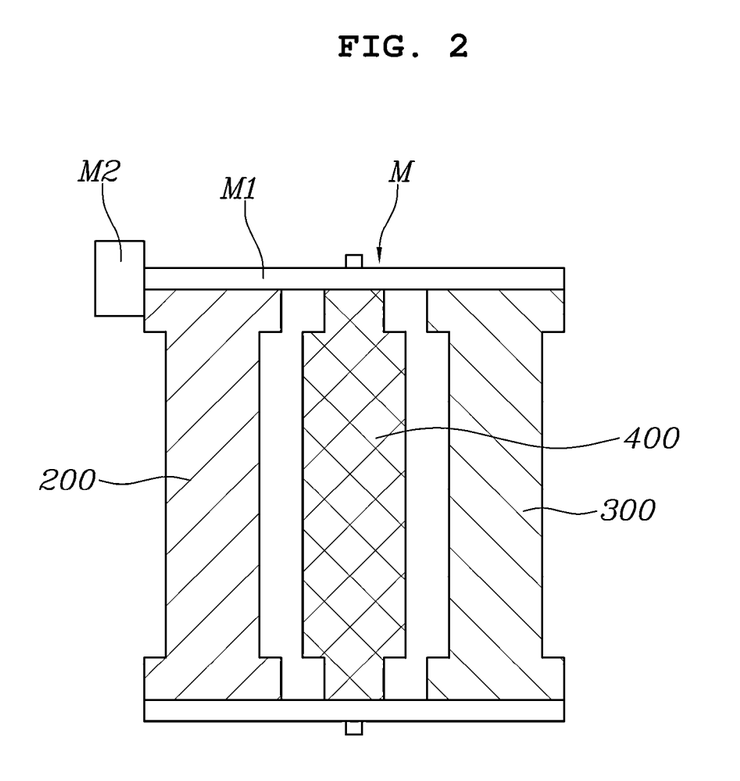
FIG. 2 is a view illustrating a heat exchanger, an electric heater and a sub-heat exchanger in one form of the present disclosure.
Figure 3:
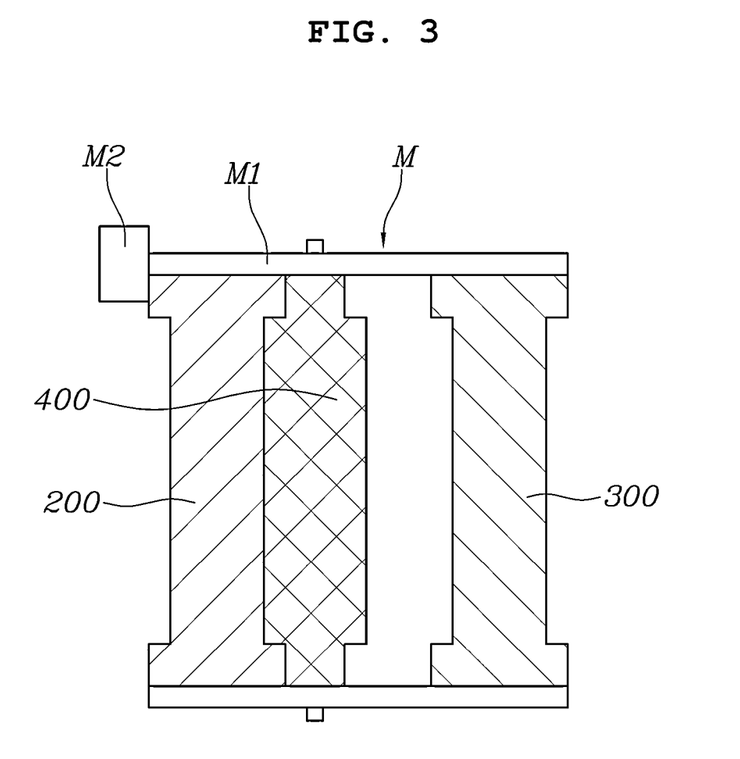
FIGS. 3 and 4 are views describing movement of the sub-heat exchanger according to some forms of the present disclosure.
Figure 4:
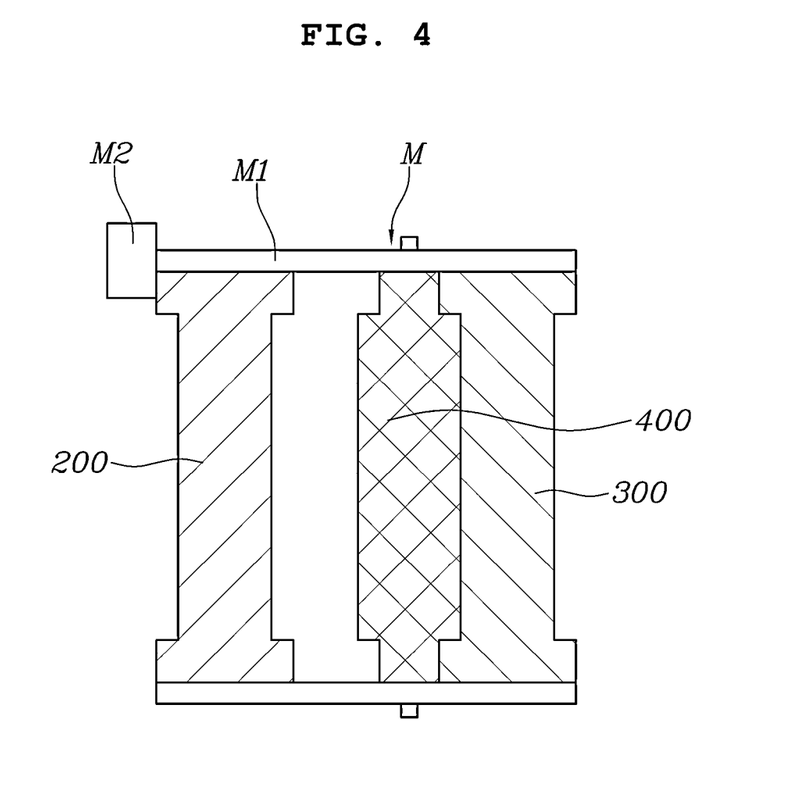
Figure 5:
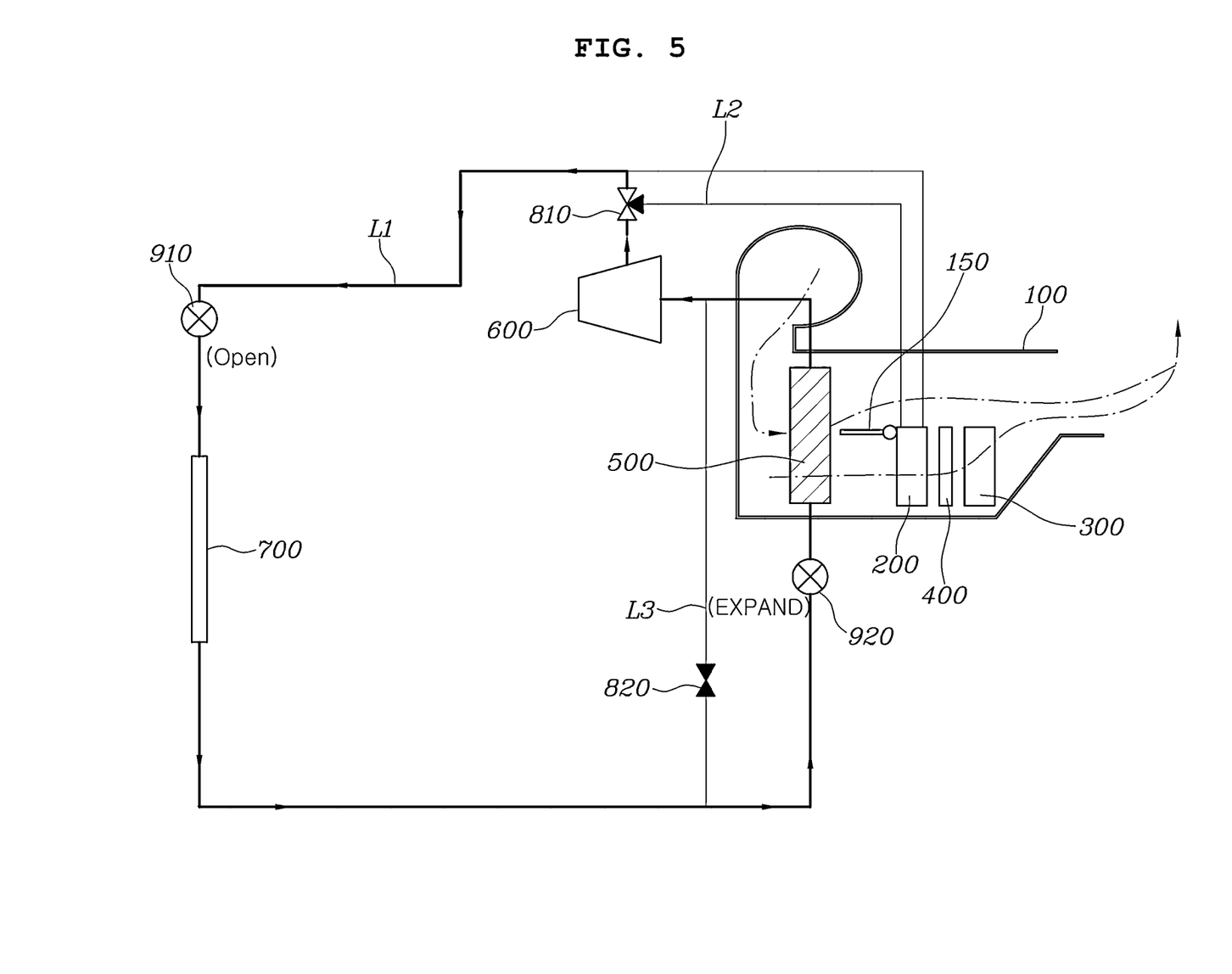
FIG. 5 is a circuit diagram of an air conditioning system for electric motor vehicles according to another form of the present disclosure, which is operated in a cooling mode.
Figure 6:
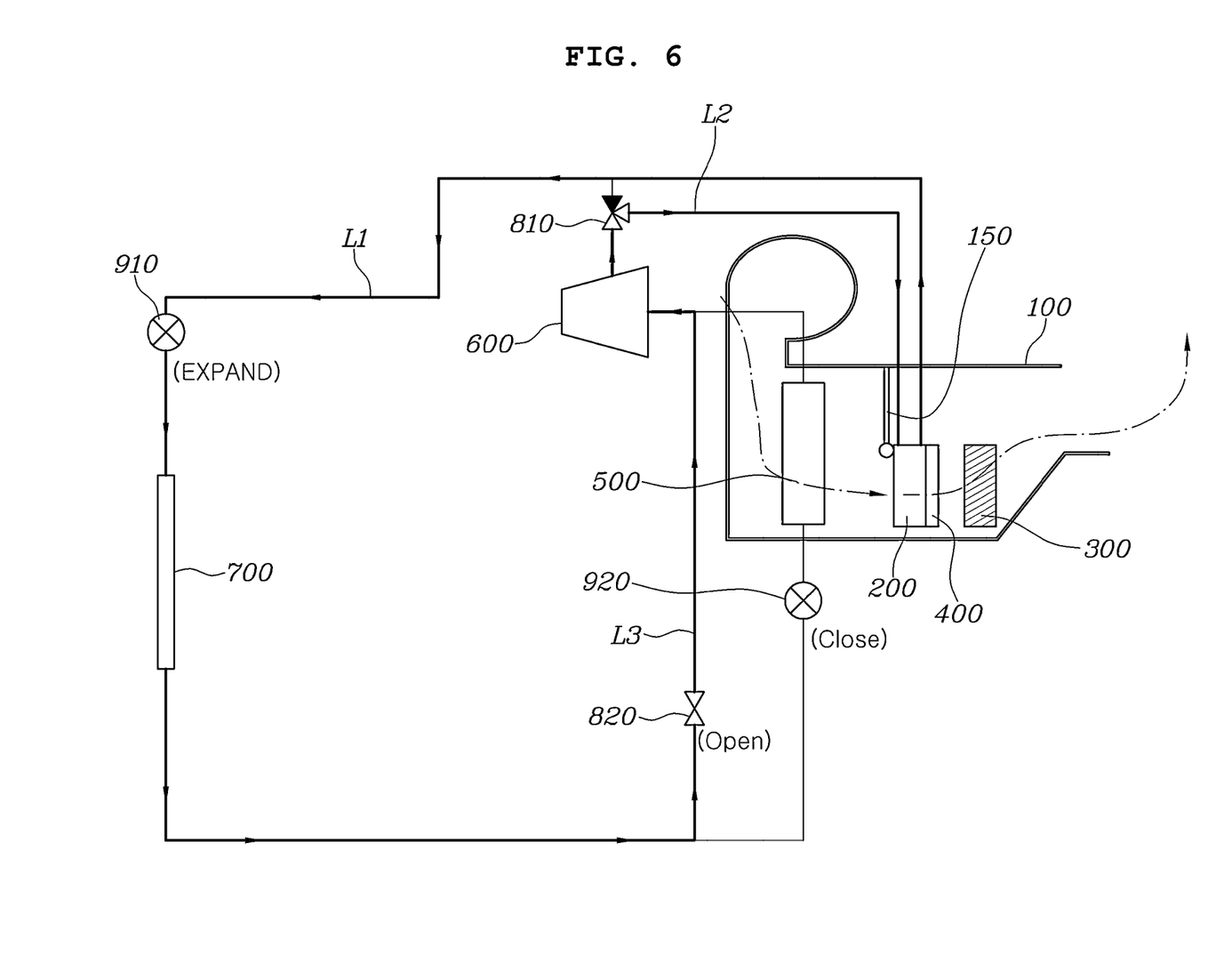
FIG. 6 is a circuit diagram of the air conditioning system for electric motor vehicles according to one form of the present disclosure, which is operated in a heating mode using the heat exchanger.
Figure 7:
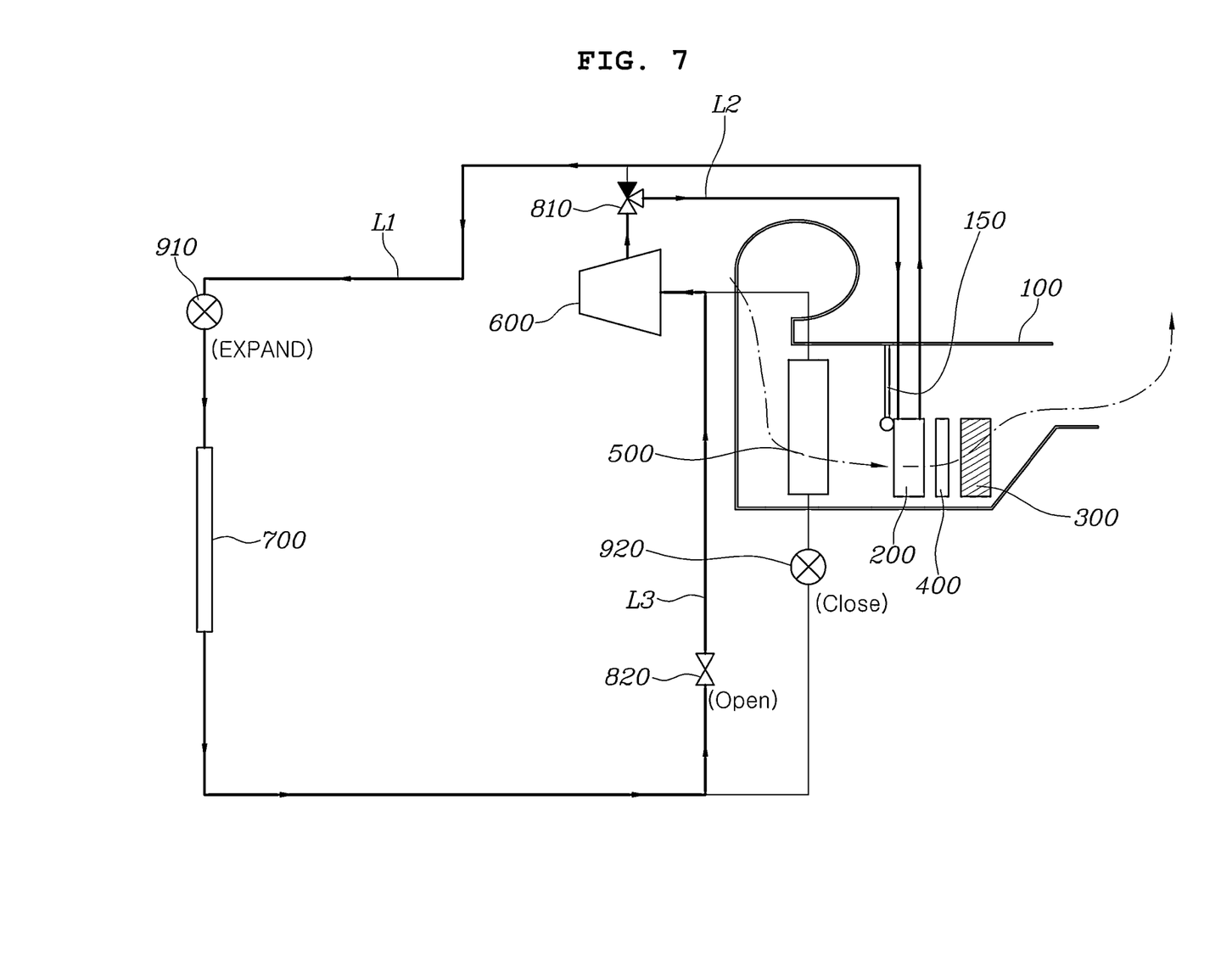
FIG. 7 is a circuit diagram of the air conditioning system for electric motor vehicles according to one form of the present disclosure, which is operated in the heating mode using the heat exchanger and the electric heater.

FIG. 1 is a view illustrating an air conditioning apparatus for electric motor vehicles according to one form of the present disclosure, FIG. 2 is a view illustrating a heat exchanger, an electric heater and a sub-heat exchanger, FIGS. 3 and 4 are views describing movement of the sub-heat exchanger according to one embodiment, FIG. 5 is a circuit diagram of an air conditioning system for electric motor vehicles according to the present disclosure, which is operated in a cooling mode, FIG. 6 is a circuit diagram of the air conditioning system for electric motor vehicles according to the present disclosure, which is operated in a heating mode using the heat exchanger, and FIG. 7 is a circuit diagram of the air conditioning system for electric motor vehicles according to the present disclosure, which is operated in the heating mode using the heat exchanger and the electric heater.

In one form of the present disclosure, the air conditioning apparatus for electric motor vehicles includes: as shown in FIG. 1, a housing 100 provided with an air inlet 110 and at least one air outlet 120 such that air is circulated therethrough, a heat exchanger 200 and an electric heater 300 provided to heat the air circulated in the housing 100 so as to form heated air, and a sub-heat exchanger 400 provided between the heat exchanger 200 and the electric heater 300 so as to be movable therebetween depending on a heating operating condition and configured such that heat generated by the heat exchanger 200 and the electric heater 300 may be conducted to the sub-heat exchanger 400 so as to improve heat conduction performance of the heat exchanger 200 and the electric heater 300.

The air conditioning apparatus for electric motor vehicles according to another form of the present disclosure further includes: an evaporator 500 provided in the housing 100 and configured to cool the air so as to form cooled air and to selectively share a refrigerant with the heat exchanger 200.

Therefore, the refrigerant is selectively circulated to the heat exchanger 200 or evaporator 500, thereby being capable of performing heating or cooling and improving heating or cooling efficiency through a heat pump.

Here, the housing 100 is provided with the air inlet 110 formed at one side thereof and at least one outlet 120 formed at the other side thereof, and thus, the temperature of air flowing into the air inlet 110 may be adjusted by the evaporator 500 or the heat exchanger 200 and the electric heater 300 and then the air having the adjusted temperature may be supplied to the interior of an electric motor vehicle as conditioned air.

In one form, the housing 100 has a first air flow path 130 configured to be connected to the air inlet 110 and to communicate with a corresponding one of the at least one air outlet 120 via the evaporator 500 and a second air flow path 140 configured to branch off from the first air flow path 130 and to communicate with another corresponding one of the at least one air outlet 120 via the heat exchanger 200 and the electric heater 300, and a temperature control door 150 is provided at a branch point of the second air flow path 140 off from the first air flow path 130.

With this configuration, when the temperature control door 150 closes the second air flow path 140, air flowing into the housing 100 through the air inlet 110 passes through the evaporator 500 and is discharged to the outside through the corresponding air outlet 120, and thus, cooled air may be provided to the interior of the electric motor vehicle.

Further, when the temperature control door 150 opens the second air flow path 140, the air flowing into the housing 100 through the air inlet 110 passes through the heat exchanger 200 and the electric heater 300 and is discharged to the outside through the corresponding air outlet 120, and thus, heated air may be provided to the interior of the electric motor vehicle.

As such, the open degrees of the first air flow path 130 and the second air flow path 140 are adjusted by the temperature control door 150, and thereby, cooled air or heated air may be provided to the interior of the electric motor vehicle at a desired temperature.

Here, a plurality of air outlets 120 of the housing 100 may be provided such that various vents, such as a defrost vent, a foot vent, etc., may be applied, and a door configured to adjust the open degree of each of the vents may be installed at a corresponding one of the vents.

In one form, the electric heater 300 may be a positive temperature coefficient (PTC) heater.

In another form, the heat exchanger 200 and the electric heater 30 are disposed so as to be spaced apart from each other in the housing 100, and the sub-heat exchanger 400 is provided between the heat exchanger 200 and the electric heater 300.

Here, the sub-heat exchanger 400 is provided so as to be movable between the heat exchanger 200 and the electric heater 300, and is configured such that heat generated by the heat exchanger 200 and the electric heater 300 may be conducted to the sub-heat exchanger 400. That is, the sub-heat exchanger 400 may be configured such that heat may be conducted thereto through the heat exchanger 200 or the electric heater 300, and may include a heat conduction fin so as to discharge heat to air when the air passes through the sub-heat exchanger 400.

In one form of the present disclosure, the sub-heat exchanger 400 is moved towards the heat exchanger 200 or the electric heater 300 depending on whether or not the heat exchanger 200 and the electric heater 300 are operated in various heating conditions, and may thus increase the heat dissipation area of the heat exchanger 200 or the heat dissipation area of the electric heater 300 so as to improve heating performance.

As shown in FIGS. 1 and 2, the heat exchanger 200 and the electric heater 300 are disposed so as to be spaced apart from each other, and the sub-heat exchanger 400 is slid or rotated in the state in which the sub-heat exchanger 400 is spaced apart from the heat exchanger 200 and the electric heater 300, so as to be selectively moved towards the heat exchanger 200 or the electric heater 300.

As such, the heat exchanger 200 and the electric heater 300 are spaced apart from each other so as to implement an effective heat pump. Particularly, the sub-heat exchanger 400 is provided between the heat exchanger 200 and the electric heater 300 so as to be slidable or rotatable, and is selectively moved towards the heat exchanger 200 or the electric heater 300.

Thereby, when the sub-heat exchanger 400 is moved towards the heat exchanger 200 so as to come into contact therewith, heat generated by the heat exchanger 200 is conducted to the sub-heat exchanger 400, the heat dissipation area is increased by the heat exchanger 200 and the sub-heat exchanger 400, and thus, heating performance due to the heat exchanger 200 is improved.

Further, when the sub-heat exchanger 400 is moved towards the electric heater 300 so as to come into contact therewith, heat generated by the electric heater 300 is conducted to the sub-heat exchanger 400, the heat dissipation area is increased by the electric heater 300 and the sub-heat exchanger 400, and thus, heating performance due to the electric heater 300 is improved.

The sub-heat exchanger 400 may be moved towards the heat exchanger 200 or the electric heater 30 by a moving module M. The moving module M is installed in the housing 100 such that the sub-heat exchanger 400 is connected to the moving module M, and moves the sub-heat exchanger towards the heat exchanger or the electric heater depending on whether of not the moving module M is operated, so as to perform thermal conduction.

The moving module M includes rail units M1 installed in the housing 100 and configured to extend towards the heat exchanger 200 and the electric heater 300 such that the sub-heat exchanger 400 is movably connected the rail units M1, and a driving unit M2 installed in the housing 100 so as to be connected to the sub-heat exchanger 400 and operated to move the sub-heat exchanger 400 along the rail units M1.

As shown in FIG. 2, the moving module M includes the rail units M1 and the driving unit M2. Here, the rail units M1 extend towards the heat exchanger 200 and the electric heater 300 so as to form a path along which the sub-heat exchanger 400 may be moved towards the heat exchanger 200 or the electric heater 300.

These rail units M1 are provided in a pair, and the upper and lower ends of the sub-heat exchanger 400 may be slidably connected to the respective rail units M1.

Further, the driving unit M2 is installed adjacent to the rail units M1 in the housing 100, and the driving unit M2 is connected to the sub-heat exchanger 400 so as to move the sub-heat exchanger 400. The driving unit M2 and the sub-heat exchanger 400 may be connected via a rack and pinion, a solenoid, or the like.

Therefore, the sub-heat exchanger 400 is moved along the rail units M1 when the driving unit M2 is operated, and thereby, comes into contact with the heat exchanger 200 or the electric heater 300, thus selectively improving heating performance of the heat exchanger 200 or the electric heater 300.

The surfaces of the heat exchanger 200 and the sub-heat exchanger 400 opposite each other may be configured to be matched with each other, and the surfaces of the electric heater 300 and the sub-heat exchanger 400 opposite each other may be configured to be matched with each other.

That is, because the sub-heat exchanger 400 needs to receive heat from the heat exchanger 200 or the electric heater 300 when the sub-heat exchanger 400 comes into contact with the heat exchanger 200 or the electric heater 300, in order to assure conduction performance of heat generated by the heat exchanger 200 and the electric heater 300, the sub-heat exchanger 400 is configured so as to be matched with the heat exchanger 200 and the electric heater 300.

For example, as shown in FIG. 2, the surface of the heat exchanger 200 opposite the sub-heat exchanger 400 may be depressed, and the surface of the sub-heat exchanger 400 opposite the heat exchanger 200 may protrude. Therefore, when the sub-heat exchanger 400 and the heat exchanger 200 are matched with each other, the opposite surfaces of the sub-heat exchanger 400 and the heat exchanger 200 come into contact with each other, and thus, heat generated by the heat exchanger 200 may be effectively transmitted to the sub-heat exchanger 400.

Further, the surface of the electric heater 300 opposite the sub-heat exchanger 400 may be depressed, and the surface of the sub-heat exchanger 400 opposite the electric heater 300 may protrude, and therefore, when the sub-heat exchanger 400 and the electric heater 300 are matched with each other, the opposite surfaces of the sub-heat exchanger 400 and the electric heater 300 come into contact with each other, and thus, heat generated by the electric heater 300 may be effectively transmitted to the sub-heat exchanger 400.

Further, as the sub-heat exchanger 400 is matched with the heat exchanger 200 and the electric heater 300 by inserting the protruding parts of the sub-heat exchanger 400 into the depressed parts of the heat exchanger 200 and the electric heater 300, the connection state between the sub-heat exchanger 400 and the heat exchanger 200 or the electric heater 300 may be stably maintained when the sub-heat exchanger 400 comes into contact with the heat exchanger 200 or the electric heater 300.

The air conditioning apparatus for electric motor vehicles according to the present disclosure may secure heating performance depending on the operating condition of the heat exchanger 200 or the electric heater 300 through the sub-heat exchanger 400.

That is, when heated air is formed through the heat exchanger 200, the sub-heat exchanger 400 is moved towards the heat exchanger 200 so that heat from the heat exchanger 200 is conducted to the sub-heat exchanger 400, as shown in FIG. 3.

As such, in a heating condition using heat generated by the heat exchanger 200, the sub-heat exchanger 400 is moved towards the heat exchanger 200 so that the heat generated by the heat exchanger 200 is conducted to the sub-heat exchanger 400, and thus, heating performance through the heat exchanger 200 is improved due to increase in the heat dissipation area of the heat exchanger 200.

Further, when heated air is formed through the electric heater 300, the sub-heat exchanger 400 is moved towards the electric heater 300 so that heat from the electric heater 300 is conducted to the sub-heat exchanger 400, as shown in FIG. 4.

As such, in a heating condition using heat generated by the electric heater 300, the sub-heat exchanger 400 is moved towards the electric heater 300 so that the heat generated by the electric heater 300 is conducted to the sub-heat exchanger 400, and thus, heating performance through the electric heater 300 is improved due to increase in the heat dissipation area of the electric heater 300.

Moreover, when heated air is formed through the heat exchanger 200 and the electric heater 300, the sub-heat exchanger 400 is located at a neutral position between the heat exchanger 200 and the electric heater 300.

As shown in FIG. 2, in a heating condition using heat generated by both the heat exchanger 200 and the electric heater 300, the sub-heat exchanger 400 is located at the neutral position between the heat exchanger 200 and the electric heater 300 so that the sub-heat exchanger 400 receives the heat generated by the heat exchanger 200 and the heat generated by the electric heater, and such heat is dissipated to air passing through the sub-heat exchanger 400. Thus, heating performance through both the heat exchanger 200 and the electric heater 300 is improved due to increase in the dissipation area of the heat generated by the heat exchanger 200 and the heat generated by the electric heater 300.

Next, an air conditioning system for electric motor vehicles using the above-described air conditioning apparatus for electric motor vehicles will be described below.

As shown in FIG. 5, the air conditioning system for electric motor vehicles according to the present disclosure includes a refrigerant line L1 including a compressor 600, a condenser 700, expanders and the evaporator 500, and a heat pump line L2 configured to branch off from the refrigerant line after the compressor 600 and including the heat exchanger 200.

Here, the refrigerant line L1 includes the compressor 600, a first valve 810 provided at a branch point of the heat pump line L2 off from the refrigerant line L1, a first expander 910, the condenser 700, a second expander 920 and the evaporator 500. In another form, the air conditioning system includes a bypass line L3 which extends towards the compressor 600 and includes a second valve 820. The bypass line L3 branches off from the refrigerant line L1 at a junction point between the condenser 700 and the second expander 920.

During the refrigerant is circulated along the refrigerant line L1, the heat pump line L2 and the bypass line L3, air may be cooled or heated depending on the circulation direction of the refrigerant, and the heat pump may be implemented.

Here, the compressor 600 compresses and discharges the refrigerant so as to circulate the refrigerant along the respective lines L1, L2 and L3, and the expanders 910 and 920 expand the refrigerant, are completely open so as to allow the refrigerant to pass therethrough, or are closed so as to prevent the refrigerant from passing therethrough, depending on whether or not heating or cooling is performed.

The condenser 700 may be disposed outdoors, and may adjust the temperature of the refrigerant through rotation of a radiator fan.

The above-described air conditioning system for electric motor vehicles may provide conditioned air, the temperature of which is adjusted, through a controller (not shown) configured to control the first expander 910, the second expander 920, the first valve 810 and the second valve 820 depending on a predetermined cooling mode or heating mode or temperature adjustment.

That is, the controller (not shown) may determine a specific mode based on an indoor temperature condition, and may control the first expander 910, the second expander 920, the first valve 810 and the second valve 820, thereby being capable of circulating the refrigerant along the respective lines L1, L2 and L3 so as to provide cooled air or heated air.

In more detail, in the cooling mode, the first valve 810 is open towards the bypass line L3, the second valve 820 is closed, the first expander 910 is completely open, the second expander 920 expands the refrigerant, the electric heater 300 is not operated, and the sub-heat exchanger 400 is located at the neutral position between the heat exchanger 200 and the electric heater 300.

Thereby, as shown in FIG. 5, the refrigerant compressed by the compressor 600 is not circulated to the heat exchanger 200, but is circulated to the first expander 910, the condenser 700, the second expander 920 and the evaporator 500. Therefore, the refrigerant is not circulated to the heat exchanger 200, and thus, air is not heated through the heat exchanger 200.

As the first expander 910 is completely open, the refrigerant passes through the first expander 910 and is moved towards the condenser 700, and heat of the refrigerant is dissipated through the condenser 700. Thereafter, the refrigerant is expanded by the second expander 920 and is evaporated by the evaporator 500, and thus cools air passing through the evaporator 500.

Further, because the electric heater 300 is not operated and the sub-heat exchanger 400 is located at the neutral position between the heat exchanger 200 and the electric heater 300, heated air is not formed through the heat exchanger 200, the electric heater 300 and the sub-heat exchanger 400. Therefore, cooled air may be provided to the interior of the electric motor vehicle.

When heating is performed using the heat exchanger 200 in the heating mode, the first valve 810 is open towards the heat exchanger 200, the second valve 820 is open, the first expander 910 expands the refrigerant, the second expander 920 is closed, the electric heater 300 is not operated, and the sub-heat exchanger 400 is moved towards the heat exchanger 200.

Thereby, as shown in FIG. 6, the refrigerant compressed by the compressor 600 is circulated to the heat exchanger 200 through the heat pump line L2, and therefore, air is heated by dissipating heat of the refrigerant through the heat exchanger 200, and thus heated air may be formed.

As the first expander 910 expands the refrigerant, the refrigerant condensed by passing through the heat exchanger 200 is expanded, and the expanded refrigerant is circulated to the condenser 700 and is evaporated by the condenser 700 so as to absorb ambient heat. Thereafter, as the second valve 820 is open and the second expander 920 is closed, the refrigerant is circulated to the compressor 600. Here, because the refrigerant absorbs ambient heat in the condenser 700 prior to the compressor 600, the temperature of the refrigerant is raised and thus the temperature of the refrigerant is additionally raised by the compressor 600. Through implementation of such a heat pump, when the refrigerant in a high-temperature state compressed by the compressor 600 is circulated to the heat exchanger 200, heating efficiency through the heat exchanger 200 is improved.

In addition, because the electric heater 300 is not operated and the sub-heat exchanger 400 is moved towards the heat exchanger 200, the heat dissipation area of the heat exchanger 200 is increased by the sub-heat exchanger 400, and thus heating performance through the heat exchanger 200 is improved.

When heating is performed using the electric heater 300 in the heating mode, the electric heater 300 is operated, and the sub-heat exchanger 400 is moved towards the electric heater 300.

That is, a situation in which heating is performed using only the electric heater 300 corresponds to a situation in which heating is performed in an initial heating condition or a situation in which it is difficult to operate the heat pump, and in this case, the electric heater 300 is operated, and the sub-heat exchanger 400 is moved towards the electric heater 300.

Thereby, the heat dissipation area of the electric heater 300 is increased and thus heating performance through the electric heater 300 is improved.

Otherwise, when heating is performed using both the heat exchanger 200 and the electric heater 300 in the heating mode, the first valve 810 is open towards the heat exchanger 200, the second valve 820 is open, the first expander 910 expands the refrigerant, the second expander 920 is closed, the electric heater 300 is operated, and the sub-heat exchanger 400 is located at the neutral position between the heat exchanger 200 and the electric heater 300.

Thereby, as shown in FIG. 7, the refrigerant compressed by the compressor 600 is circulated to the heat exchanger 200 through the heat pump line L2, and therefore, air is heated by dissipating heat of the refrigerant through the heat exchanger 200, and thus heated air may be formed.

As the first expander 910 expands the refrigerant, the refrigerant condensed by passing through the heat exchanger 200 is expanded, and the expanded refrigerant is circulated to the condenser 700 and is evaporated by the condenser 700 so as to absorb ambient heat. Thereafter, as the second valve 820 is open and the second expander 920 is closed, the refrigerant is circulated to the compressor 600. Here, because the refrigerant absorbs ambient heat in the condenser 700 prior to the compressor 600, the temperature of the refrigerant is raised and thus the temperature of the refrigerant is additionally raised by the compressor 600. Through implementation of such a heat pump, when the refrigerant in a high-temperature state compressed by the compressor 600 is circulated to the heat exchanger 200, heating efficiency through the heat exchanger 200 is improved.

In addition, because the electric heater 300 is operated and the sub-heat exchanger 400 is located at the neutral position between the heat exchanger 200 and the electric heater 300, the sub-heat exchanger 400 receives heat generated by the heat exchanger 200 and heat generated by the electric heater 300, and dissipates the heat to air passing through the sub-heat exchanger 400. Thereby, the dissipation area of the heat generated by the heat exchanger 200 and the electric heater 300 is increased, and thus heating performance through the heat exchanger 200 and the electric heater 300 is improved.

Otherwise, when heating is performed using both the heat exchanger 200 and the electric heater 300, the sub-heat exchanger 400 may be moved towards one of the heat exchanger 200 and the electric heater 300, the temperature of which is higher than the other, and thus, heating performance may be assured.

In the air conditioning apparatus for electric motor vehicles having the above-described structure and the air conditioning system for electric motor vehicles using the same, the sub-heat exchanger 400 is provided between the heat exchanger 200 and the electric heater 300, and the sub-heat exchanger 400 is moved towards the heat exchanger 200 or the electric heater 300 so that heat is conducted to the sub-heat exchanger 400 depending on whether or not the heat exchanger 200 and the electric heater 300 are operated depending on a heating condition, thereby increasing a heat dissipation area through the sub-heat exchanger 400 during heating and thus being capable of improving heating performance.

As is apparent from the above description, in an air conditioning apparatus for electric motor vehicles and an air conditioning system for electric motor vehicles using the same according to the present disclosure, a sub-heat exchanger is provided between a heat exchanger and an electric heater, and the sub-heat exchanger is moved towards the heat exchanger or the electric heater so that heat is conducted to the sub-heat exchanger depending on whether or not the heat exchanger and the electric heater are operated depending on a heating condition, thereby increasing a heat dissipation area through the sub-heat exchanger during heating and thus being capable of improving heating performance.

Although the various embodiments of the present disclosure have been disclosed for illustrative purposes, those skilled in the art should appreciate that various modifications, additions and substitutions are possible, without departing from the scope and spirit of the present disclosure.

What is claimed is:

1. An air conditioning apparatus for electric motor vehicles, comprising:
   a housing provided with an air inlet and at least one air outlet such that air is circulated through the air inlet and the at least one outlet;
   a heat exchanger and an electric heater both configured to heat the air circulated in the housing; and
   a sub-heat exchanger provided between the heat exchanger and the electric heater and configured to move between the heat exchanger and the electric heater such that heat generated by the heat exchanger and the electric heater is conducted to the sub-heat exchanger.

2. The air conditioning apparatus according to claim 1, further comprising: an evaporator provided in the housing and configured to cool the air so as to form cooled air and to selectively share a refrigerant with the heat exchanger.

3. The air conditioning apparatus according to claim 2, wherein the housing includes:
   a first air flow path configured to be connected to the air inlet and to communicate with the at least one air outlet via the evaporator;
   a second air flow path configured to branch off from the first air flow path and to communicate with the at least one air outlet via the heat exchanger and the electric heater; and
   a temperature control door provided at a branch point at which the second air flow path is branched off from the first air flow path.

4. The air conditioning apparatus according to claim 1, wherein:
   the heat exchanger is spaced apart from the electric heater; and
   the sub-heat exchanger is slid or rotated based on a heating operating condition in a state in which the sub-heat exchanger is spaced apart from the heat exchanger and the electric heater, so as to be selectively moved towards the heat exchanger or the electric heater.

5. The air conditioning apparatus according to claim 1, further comprising:
   a moving module installed in the housing and connected to the sub-heat exchanger, and configured to move the sub-heat exchanger towards the heat exchanger or the electric heater.

6. The air conditioning apparatus according to claim 5, wherein the moving module comprises:
   rail units installed in the housing and configured to extend towards the heat exchanger and the electric heater such that the sub-heat exchanger is movably connected to the rail units; and
   a driving unit installed in the housing and connected to the sub-heat exchanger and configured to move the sub-heat exchanger along the rail units.

7. The air conditioning apparatus according to claim 1, wherein surfaces of the heat exchanger and the sub-heat exchanger opposite each other are configured to be matched with each other, and surfaces of the electric heater and the sub-heat exchanger opposite each other are configured to be matched with each other.

8. The air conditioning apparatus according to claim 1, wherein, when the heated air is formed through the heat exchanger, the sub-heat exchanger is moved towards the heat exchanger so that heat from the heat exchanger is conducted to the sub-heat exchanger.

9. The air conditioning apparatus according to claim 1, wherein, when the heated air is formed through the electric heater, the sub-heat exchanger is moved towards the electric heater so that heat from the electric heater is conducted to the sub-heat exchanger.

10. The air conditioning apparatus according to claim 1, wherein, when the heated air is formed through the heat exchanger and the electric heater, the sub-heat exchanger is located at a neutral position between the heat exchanger and the electric heater.

11. An air conditioning system including the air conditioning apparatus of claim 1, the air conditioning system further comprising:
    a refrigerant line comprising a compressor, a condenser, expanders and an evaporator; and
    a heat pump line configured to branch off from the refrigerant line after the compressor and including the heat exchanger.

12. The air conditioning system according to claim 11, wherein the refrigerant line comprises the compressor, a first valve provided at a branch point of the heat pump line off from the refrigerant line, a first expander, the condenser, a second expander and the evaporator.

13. The air conditioning system according to claim 12, wherein, when heating is performed using the electric heater in a heating mode, the electric heater is operated, and the sub-heat exchanger is moved towards the electric heater.

14. The air conditioning system according to claim 12, further comprising: a bypass line configured to extend towards the compressor and comprising a second valve, wherein the bypass line branches off from the refrigerant line at a junction point between the condenser and the second expander.

15. The air conditioning system according to claim 14, wherein, in a cooling mode, the first valve is open towards the bypass line, the second valve is closed, the first expander is fully open, the second expander expands the refrigerant, the electric heater is not operated, and the sub-heat exchanger is located at a neutral position between the heat exchanger and the electric heater.

16. The air conditioning system according to claim 14, wherein, when heating is performed using the heat exchanger in a heating mode, the first valve is open towards the heat exchanger, the second valve is open, the first expander expands the refrigerant, the second expander is closed, the electric heater is not operated, and the sub-heat exchanger is moved towards the heat exchanger.

17. The air conditioning system according to claim 14, wherein, when heating is performed using both the heat exchanger and the electric heater in a heating mode, the first valve is open towards the heat exchanger, the second valve is open, the first expander expands the refrigerant, the second expander is closed, the electric heater is operated, and the sub-heat exchanger is located at a neutral position between the heat exchanger and the electric heater.

* * * * *